United States Patent
Eyers et al.

(10) Patent No.: US 10,512,865 B2
(45) Date of Patent: Dec. 24, 2019

(54) DEVICES AND METHODS FOR ALIGNING FILTERS IN A HOLDING FRAME

(71) Applicants: William Keith Albert Eyers, Chobham (GB); Etienne Rene Pascal Jarrier, Basingstoke (GB)

(72) Inventors: William Keith Albert Eyers, Chobham (GB); Etienne Rene Pascal Jarrier, Basingstoke (GB)

(73) Assignee: BHA Altair, LLC, Franklin, TN (US)

( * ) Notice: Subject to any disclaimer, the term of this patent is extended or adjusted under 35 U.S.C. 154(b) by 147 days.

(21) Appl. No.: 15/425,078

(22) Filed: Feb. 6, 2017

(65) Prior Publication Data

US 2018/0221801 A1 Aug. 9, 2018

(51) Int. Cl.
| | | |
|---|---|---|
| *B01D 46/00* | (2006.01) | |
| *B01D 59/50* | (2006.01) | |
| *F02C 7/052* | (2006.01) | |
| *F02C 7/055* | (2006.01) | |
| *B01D 46/52* | (2006.01) | |
| *B01D 46/12* | (2006.01) | |

(52) U.S. Cl.
CPC ....... *B01D 46/0005* (2013.01); *B01D 46/002* (2013.01); *F02C 7/052* (2013.01); *F02C 7/055* (2013.01); *B01D 46/125* (2013.01); *B01D 46/521* (2013.01); *B01D 2265/026* (2013.01); *B01D 2271/022* (2013.01); *F05D 2240/91* (2013.01); *F05D 2260/36* (2013.01)

(58) Field of Classification Search
CPC .............. B01D 46/0005; B01D 46/002; B01D 46/0015; B01D 46/521; B01D 59/50; B01D 46/00

USPC ......... 55/483, 484, 493, 495, 496, 501, 502, 55/507, 511, 490, DIG. 31, DIG. 5; 264/257
See application file for complete search history.

(56) References Cited

U.S. PATENT DOCUMENTS

| | | | | |
|---|---|---|---|---|
| 1,788,171 A | * | 1/1931 | Stebbins ................ | B01D 46/12 292/DIG. 35 |
| 2,869,694 A | * | 1/1959 | Breckheimer ......... | B01D 46/10 52/658 |
| 3,360,910 A | | 1/1968 | Soltis | |
| 3,394,534 A | * | 7/1968 | Andrews ................ | B01D 46/02 55/484 |
| 3,999,969 A | * | 12/1976 | Shuler .................... | B01D 46/00 55/418 |
| 5,188,646 A | * | 2/1993 | Nolen, Jr. .......... | B01D 46/0002 55/486 |
| 5,554,203 A | * | 9/1996 | Borkent ................. | B01D 46/02 55/378 |

(Continued)

FOREIGN PATENT DOCUMENTS

EP 2218490 A1 8/2010

*Primary Examiner* — Minh Chau T Pham
(74) *Attorney, Agent, or Firm* — Reinhart Boerner Van Deuren P.C.

(57) ABSTRACT

A filtration system for a gas turbine engine is provided. The filtration system may include a holding frame with a positioning element extending therefrom and a filter element for mounting within the holding frame. The frame of the filter element may include a positioning slot therein such that the positioning element extends into the positioning slot when the filter element is mounted within the holding frame.

37 Claims, 11 Drawing Sheets

(56) References Cited

U.S. PATENT DOCUMENTS

| | | | | |
|---|---|---|---|---|
| 5,935,282 A * | 8/1999 | Lin | ............... | B01D 46/0004 55/385.6 |
| 7,156,892 B2 * | 1/2007 | Kim | ............... | B01D 46/0002 454/292 |
| 7,540,073 B1 | 6/2009 | Gilstrap | | |
| 8,048,186 B2 * | 11/2011 | Mann | ............... | F02C 7/052 55/483 |
| 8,052,770 B2 * | 11/2011 | Ayshford | ............... | B01D 46/0005 55/483 |
| 8,105,409 B2 * | 1/2012 | Mann | ............... | B01D 46/0005 55/483 |
| 8,328,895 B2 * | 12/2012 | Nicholas | ............... | B01D 46/0005 55/483 |
| 8,747,505 B2 * | 6/2014 | Crabtree | ............... | B01D 46/0005 55/482 |
| 9,034,068 B2 | 5/2015 | Ball et al. | | |
| 9,049,839 B2 | 6/2015 | Crabtree | | |
| 9,358,488 B2 | 6/2016 | Jarrier et al. | | |
| 2005/0022489 A1 | 2/2005 | Harden | | |
| 2010/0251678 A1 | 10/2010 | Mann et al. | | |
| 2014/0096493 A1 * | 4/2014 | Kelmartin | ............... | B01D 46/0002 55/482 |
| 2014/0130468 A1 * | 5/2014 | Jackson | ............... | B01D 46/0005 55/482 |
| 2014/0250845 A1 * | 9/2014 | Jackson | ............... | B01D 46/0005 55/484 |
| 2015/0135659 A1 | 5/2015 | Jarrier et al. | | |
| 2016/0101379 A1 * | 4/2016 | Eyers | ............... | B01D 46/008 55/484 |

\* cited by examiner

DEVICES AND METHODS FOR ALIGNING FILTERS IN A HOLDING FRAME

FIELD OF THE INVENTION

The present application generally relates to air filters and holding frames suitable for use with gas turbine engines. More specifically, the present application relates to holding frames and associated filters having clamping and keying features for ensuring that a correct filter element is secured in the holding frame in a correct orientation.

BACKGROUND OF THE INVENTION

Power generation equipment, such as a gas turbine engines and the like, generally uses a large supply of intake air to support the combustion process. Various types of inlet air filtration systems thus may be used upstream of the gas turbine compressor air inlet and elsewhere. Impure air laden with dust particles, salts, and other contaminants may cause damage to the compressor blades, other types of compressor components, and other components of the gas turbine engine in general. Contaminates may cause damage via corrosion, erosion, and the like. Such damage may reduce the life expectancy and performance of the compressor and also reduce the overall efficiency of the gas turbine engine. To avoid these problems, the inlet airflow generally passes through a series of filters and screens to assist in removing the contaminants before they reach the compressor or other components of the power generation system.

Such filters may include "V cell" type, "mini-pleat" or bag filters and the like. These filters are generally square in configuration and may be installed in holding frames sized according to industry standards. The use of these square frames, however, may allow for the filters to be installed in the wrong orientation. Specifically, the filters may be installed with the pleats or pockets running in a horizontal orientation rather than a substantially vertical orientation that may promote good drainage. Moreover, unsuitable or unauthorized filters also may be used, including filters having an efficiency rating or particle size rating differing from the designed specification of the air filtration system. Installing the filters in the wrong orientation or installing unsuitable filters could have a negative impact on overall gas turbine engine performance, efficiency, and/or operational lifetime of the components therein.

Additionally, filter holding frames may have open tolerances that permit a filter element to be installed in a position that is not well-centered within the holding frame. Such improper installation can result in incorrect seating of filter gaskets within the holding frame, and can result in air bypass of the filter element and thereby result in damage to a gas turbine.

There is thus a desire for an improved inlet air filtration system for use with a compressor and similar components of a gas turbine engine. Such an improved inlet air filtration system may accommodate V cell, mini-pleat, or bag filters and the like while ensuring that the appropriate filters are installed in the correct orientation for efficient operation and good sealing.

The invention provides such a filter mounting system. These and other advantages of the invention, as well as additional inventive features, will be apparent from the description of the invention provided herein.

BRIEF SUMMARY OF THE INVENTION

The present application provides a filter element for use with a filtration system. The filtration system includes a rectangular holding frame defining a holding frame plane. The holding frame also includes a clamping assembly with a positioning element extending a projection depth in the holding frame plane. The clamping assembly also includes a clamp member. The filter element includes a filter frame and a filter media coupled to the filter frame. The filter frame includes a key edge having a positioning notch having a first depth and a first width. The filter frame has a rectangular shape. Further, the positioning notch is sized and positioned to receive the positioning element with the filter element adapted for interfitting use with the rectangular holding frame.

In some embodiments, the filter frame includes a second positioning notch having a second depth and a second width.

In a further embodiment, at least one of the second depth and the second width are different than the first depth and the first width, respectively, so as to provide a keying configuration.

In some embodiments, the filter media comprises a mini-pleat filter with a plurality of pleats therein or a bag filter with a plurality of pockets therein.

In some embodiments, the filter frame comprises a rectangular gasket positioned inwardly of the positioning notch. In some embodiments, the positioning notch is contoured around the positioning notch. In other embodiments, the gasket extends to an outer edge of the key edge.

In some embodiments, the filter element comprises a support screen.

In some embodiments, the filter frame comprises a gasket stop.

In another aspect, the present application provides a filtration system. The filtration system includes a holding frame and a filter element. The holding frame includes a plurality of holding frame members arranged in a rectangular configuration to receive the filter element, and at least one filter clamping system positioned on a first holding frame member. The filter clamping system includes a first shoulder bracket extending a first positioning depth from the first holding frame member, and a first clamp member. The first clamp member is rotatable between a filter element clamping position and a filter element releasing position. The filter element includes a rectangular filter frame and a filter media coupled to the rectangular filter frame. The filter frame includes a first notch having a first depth corresponding to the first positioning depth. The holding frame is configured to receive the rectangular filter frame in a unique orientation wherein the first notch is aligned with the first shoulder bracket.

In some embodiments, the filter clamping system also includes a second shoulder bracket extending a second positioning depth from the first holding frame member and a second clamp member. The second clamp member is rotatable between a filter element clamping position and a filter element releasing position. The filter frame further comprises a second notch having a second depth corresponding to the second positioning depth.

In some embodiments, the rectangular filter frame is square.

In another aspect, the present application provides method of filtering a gas turbine engine air intake. The method includes the step of providing a holding frame with a plurality of holding frame members arranged in a rectangular configuration to receive a filter element. The holding frame includes at least one filter clamping system positioned on a first holding frame member, and the filter clamping system includes a first shoulder bracket extending a first positioning depth from the first holding frame member. The filter clamping system also includes a clamp member, wherein the clamp member is rotatable between a filter element clamping position and a filter element releasing position. The method further includes the step of providing a filter element. The filter element includes a rectangular filter frame with a first notch having a first depth corresponding to the first positioning depth, and a filter media coupled to the rectangular filter frame. The method also includes the step of positioning the filter element in the holding frame when the clamp member is in the filter element releasing position, then rotating the clamp member to the filter element clamping position. The method then provides the step of filtering intake air for a gas turbine engine, so that the holding frame is configured to receive the rectangular filter frame in a unique orientation wherein the first notch is aligned with the first shoulder bracket.

In yet another aspect, the present application provides a filter element. The filter element has an inlet end and an outlet end which are spaced apart along a central axis at least 8 inches. The filter element also includes an extension of filter media extending between the inlet end and the outlet end, and a rectangular header frame at one of the inlet and outlet ends. The rectangular header frame defines a perimeter mating interface having a first lateral span of at least 18 inches and a second lateral span perpendicular to the first lateral span of at least 18 inches. The rectangular header frame also has an inner edge facing the central axis and an outer edge facing outwardly away from the central axis A keying surface is provided along the outer edge.

In some embodiments, the keying surface is flush and non-discrete from a remainder of the outer edge along a side of the rectangular header frame. The rectangular header frame may be configured for seating against a mounting frame or tube sheet having a rectangular seating surface surrounded by upright wall with a key projection extending over the seating surface. The remainder of the outer edge along a side of the rectangular header frame and the keying surface are adapted to form a gap with the upright wall when installed of at least ¼ inch, to provide clearance for the key projection.

In some embodiments, the keying surface is defined by a notch formed in the rectangular head frame. The notch has a notch recess height in the direction of the central axis of between ½ and 1 inches and a notch width perpendicular thereto of at least ¼ inches. The notch does not extend completely axially through the rectangular header frame in a direction of the central axis. In other embodiments, the notch extends completely axially through the rectangular header frame in a direction of the central axis.

In some embodiments, the keying surface is defined at a key location between ½ and 4 inches from a corner of the rectangular header frame, and the keying surface has an outer face along the outer edge.

In some embodiments, the filter element is configured as a V-bank filter. The V-bank filter has a pair of end caps extending away from the border frame. The extension of filter media includes a plurality of filter media sections arranged in a V-Bank configuration, such that the filter media sections are between the pair of end caps and between the inlet end and the outlet end. The inlet end and the outlet end extend transversely between the end caps, with the at least one cross member extending transversely between end caps at the inlet end or the outlet end. Adjacent member sections of the filter media sections converge together at the at least one cross member and diverge away from each other as adjacent member sections extend away from the at least one cross member.

In some embodiments, the filter media sections are provided by discrete pleated panel filter media packs. The cross members and the border frame are sealingly connected to inlet and outlet edges of the filter packs at the inlet and outlet ends, while the end caps are sealingly connected to side edges of the filter media packs at opposed sides between the inlet end and the outlet end.

In some embodiments, the rectangular header comprises an axial thickness of between ½ and 1 inches.

In some embodiments, the keying surface is defined by a positioning notch formed in the rectangular header frame, with the notch comprising a notch depth of between 4 mm and 30 mm, and a notch width of between 20 and 600 mm. The depth extends into the outer edge toward the central axis, the notch width extending perpendicular thereto.

In a more particular embodiment, the rectangular header frame can include a second positioning notch having a second depth of between 4 mm and 30 mm and a second width of between 20 and 600 mm.

In an even more particular embodiment, at least one of the second depth and the second width are different than the notch depth and the notch width, respectively, so as to provide a keying configuration.

In an example, a total of at least four discrete positioning notches can be formed in the rectangular header frame with at least two notches on opposite sides of the rectangular header frame. For example, two notches may be on one side of the border frame and another two notches on another side.

Other numbers or configurations can be employed, and further a non-symmetric configuration can be used so that the filter can only be installed along a single unique installation into the rectangular tube sheet frame.

In some embodiments, the filter element is configured for use with a filtration system that includes a rectangular holding frame defining a holding frame plane with the holding frame having a clamping assembly comprising a positioning element extending a projection depth in the holding frame plane, and with the clamping assembly further comprising a clamp member. The filter element provides the keying surface that is configured and located to key with the positioning element.

In some embodiments, the keying surface comprises first and discrete second key segments that are arranged at different location around the rectangular header frame.

For example, key segments can comprise first and second positioning notches.

In some embodiments, such first and second positioning notches may be configured with at least one of different dimension relating to at least one of notch height, notch width and notch depth to provide for keying configuration.

In some embodiments, the key segments are located at non-symmetrical locations about the rectangular header frame for providing a single unique filter mounting installation for the rectangular holding frame.

The present application also provides a filtration system including the forgoing aspect of a filter element. The filtration system includes a tube-sheet holding frame. The holding frame has a plurality of holding frame members arranged in a rectangular configuration to receive the filter element. The holding frame members define a rectangular seating surface surrounded by upright wall to define rectangular tube sheet openings. The holding frame also has a filter element retainer extending over the seating surface. The retainer may be placed in a locking position with a tab over the filter element to secure the filter element to the rectangular surface, and in a release position clearing the tab from the filter element for facilitating release. The holding frame also includes a key projection extending over the seating surface, the keying surface clearing the key projection to allow seating of the filter element along the rectangular seating surface.

In some embodiments, the filter element retainer overlaps the key projection when the filter element retainer is placed in a filter securing position.

In some embodiments, the filter element retainer completely overlaps the key projection when the filter element retainer is placed in a filter securing position.

In some embodiments, the filter element retainer has a hat-shaped profile.

Embodiments of the present invention may be incorporated into a gas turbine system comprising such a filtration system, with the filtration system being part of an air intake of the gas turbine.

In still another aspect, the invention provides a filtering system. The filtering system includes a filter frame with adjacent first and second filter apertures, and at least one filter clamping system. The clamping system is positioned on a first holding frame member of the filter frame, between the first and second filter apertures. The filter clamping system includes a first shoulder bracket extending a first positioning depth from the first holding frame member, and a clamp member that is rotatable between a filter element clamping position and a filter element releasing position. The filtration system also includes first and second filter elements, each filter element having an inlet end and an outlet end. The inlet end and the outlet end are spaced apart along a central axis at least 3 inches, with an extension of filter media extending between the inlet end and the outlet end. The filter elements also include a rectangular header frame at one of the inlet and outlet ends, which defines a perimeter mating interface. The mating interface has a first lateral span of at least 18 inches and a second lateral span perpendicular to the first lateral span of at least 18 inches. The rectangular header frame also has an inner edge facing the central axis and an outer edge facing outwardly away from the central axis, and a keying surface along the outer edge. The keying surface is flush and non-discrete from a remainder of the outer edge along a side of the rectangular header frame. The first and second filter elements are spaced apart by at least the first positioning depth when the first filter element is positioned in the first filter aperture and the second filter element is positioned in the second filter aperture.

In some embodiments, the first and second filter apertures are square. In some embodiments, the keying surface is provided on the first lateral span, and the length of the first lateral span is less than the length of the second lateral span.

In some embodiments, the rectangular header frame is configured for seating against a mounting frame or tube sheet having a rectangular seating surface surrounded by upright wall with a key projection extending over the seating surface. The remainder of the outer edge along a side of the rectangular header frame and the keying surface are adapted to form a gap with the upright wall when installed of at least ¼ inch to provide clearance for the key projection. In some embodiments, the rectangular header frame comprises an axial thickness of between ½ and 1 inches.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
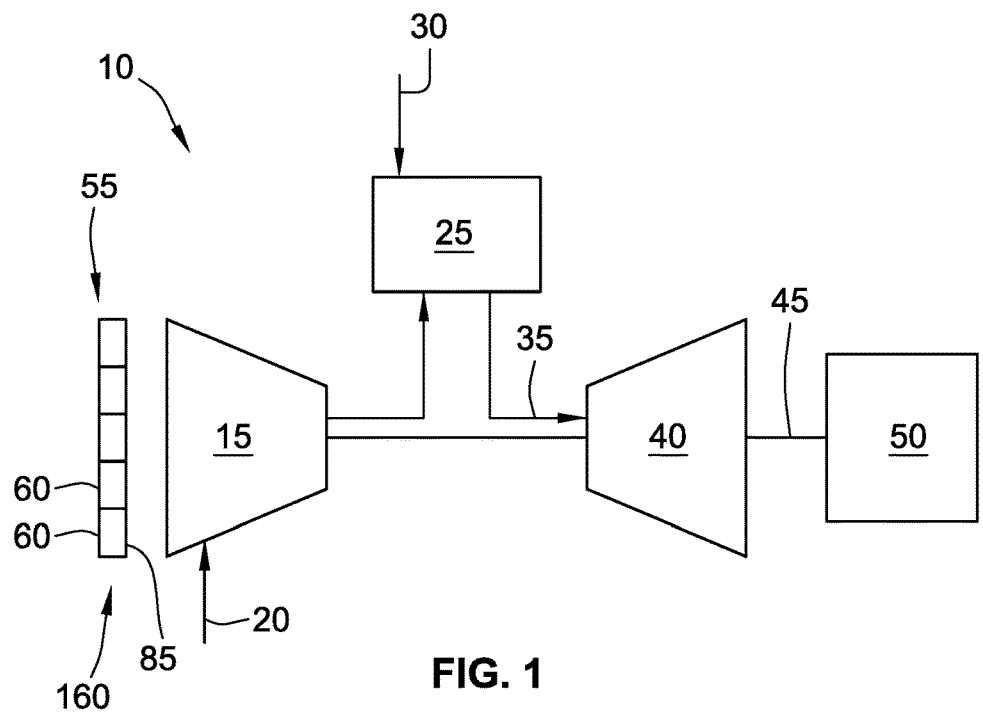
FIG. 1 is a schematic diagram of a gas turbine engine with a compressor, combustor, a turbine, a shaft, and a load. An inlet air filtration system is positioned to filter intake air of the compressor.

Referring now to the drawings, in which like numerals refer to like elements throughout the several views. FIG. 1 shows a schematic view of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of combustors 25. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50, such as an electrical generator or the like.

The gas turbine engine 10 may use natural gas, liquid fuels, various types of syngas, and/or other types of fuels or blends thereof. The gas turbine engine 10 may have different configurations and may use other types of components. Other types of gas turbine engines also may be used herein. Multiple gas turbine engines, other types of turbines, and other types of power generation equipment also may be used herein together.

The gas turbine engine 10 also may be used with a filtration system 55. The filtration system 55 may include any number of filtration units 60 positioned therein. The filtration system 55 may be positioned upstream of the compressor 15 so as to filter the incoming flow of air 20 with respect to particulate contaminates and/or water droplets. The filtration system 55 may be configured as a filter house or other type of structure.

In this example, the filtration units 60 (also referenced as filter elements) may be in the form of a number of mini-pleat filters 65 and the like. As described above, such mini-pleat filters 65 may have a generally rectangular, planar configuration. As used herein, the rectangular shape may be a square shape. Substantially rectangular shapes also may be used. Other types of filters such as bag or pocket type filters and the like also may be used herein. The filtration units 60 may be pre-filters or final filters. The filtration units 60 may include a filter media 70 therein. The filter media 70 may be made from cellulose, blends of cellulose and polyester, glass microfiber, blends of glass microfiber and synthetic fibers, composites, and the like. Any type of filter media 70 may be used herein. Differing types of filter media also may be used herein. The filter media 70 may be in the form of a number of pleats 75. Any number of the pleats 75 may be used herein in any depth and/or angle. In order to ensure efficient operation, it is preferred that the pleats 75 are provided in a vertical orientation. Such a vertical orientation allows, for example, any water captured within the pleats 75 to drain away in an efficient manner.

Figure 2:
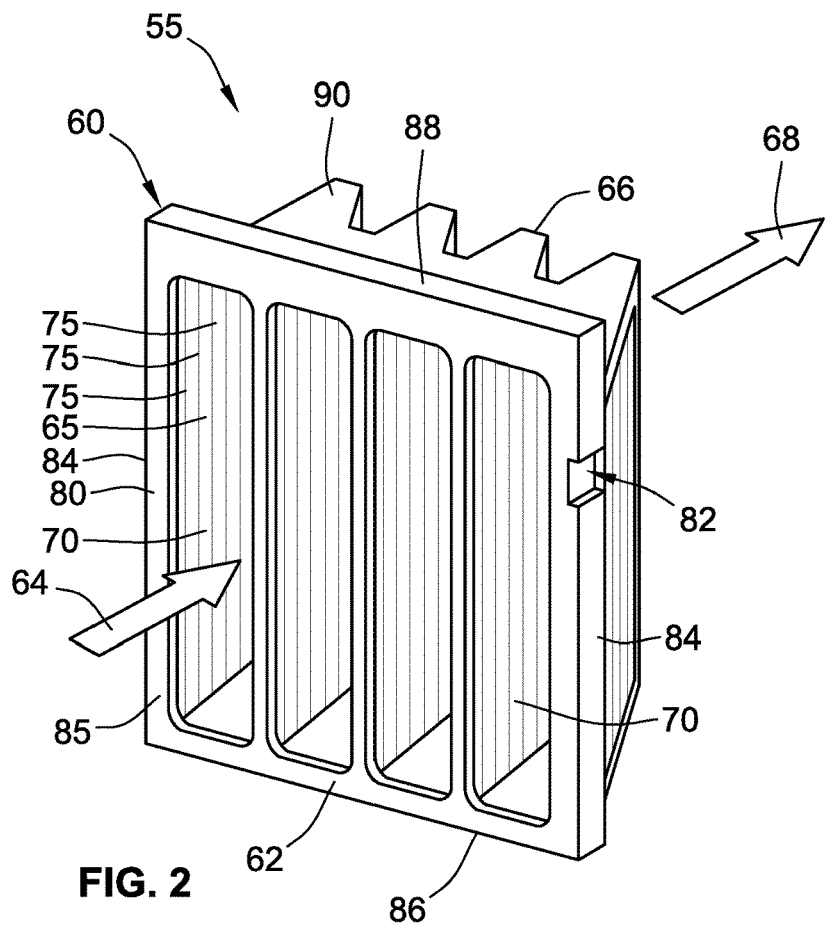
FIG. 2 is a perspective view of a filtration unit that may used with the filtration system of FIG. 1.

As shown in FIG. 2, filtration unit 60 may have a filter media 70 arranged in a substantially W-shaped orientation 80 with oriented pairs of filter media panels or segments arranged in V's with V shaped pockets therebetween to provide a V-bank filter (also referred to as a V-cell filter). The filter media 70 may be enclosed within a mounting frame 85. The mounting frame 85 is provided in a rectangular configuration. As shown, the rectangular configuration is square. The mounting frame provides a rectangular header that defines a perimeter mating interface suitable for installation on a holding frame or tube sheet (best shown in FIG. 3). The perimeter mating interface includes a first lateral span 84 of at least 18 inches, and a second lateral span 86 perpendicular to the first lateral span of at least 18 inches. In a typical embodiment, the mounting frame has an axial thickness between about ½ and 2 inches, preferably between about ¾ and 1 inches. The mounting frame 85 may be made out of a thermoplastic, a metal, or other types of substantially rigid material alone or in combination.

The filtration unit 60 includes an inlet face 62 at an inlet end for receiving an inlet air flow 64 and an outlet face 66 at an outlet end exhausting an outlet air flow 68. As shown, the direction of air flows 64, 68 are along and parallel to the central axis of the filtration unit 60. In some embodiments, inlet face 62 is spaced apart at least 3 inches, and preferably at least 12 inches, from outlet face 66. More preferably, inlet face 62 is spaced apart from outlet face 66 at least 17 inches. In one typical embodiment, inlet face 62 is spaced apart from outlet face 66 by about 24 inches. The filtration media 70 thus extends between the inlet face 62 and the outlet face 66.

The mounting frame 85 may include a pair of substantially W-shaped end caps 90 that can be potted to ends of opposed pairs of filter media panels to form upstream and downstream V-shaped pockets between pairs of panels. The end caps 90 may be positioned at the top and bottom of the filter material 70. The mounting frame 85 also may have a support screen (not shown) extending between the end caps 90. The support screen may support the filter media 70 therein and may help retain the filter media in a given shape. The support screen allows air to pass therethrough. The filtration unit 60 described herein is for the purpose of example only. Filtration units of many other designs and other configurations also may be used herein.

Figure 3:
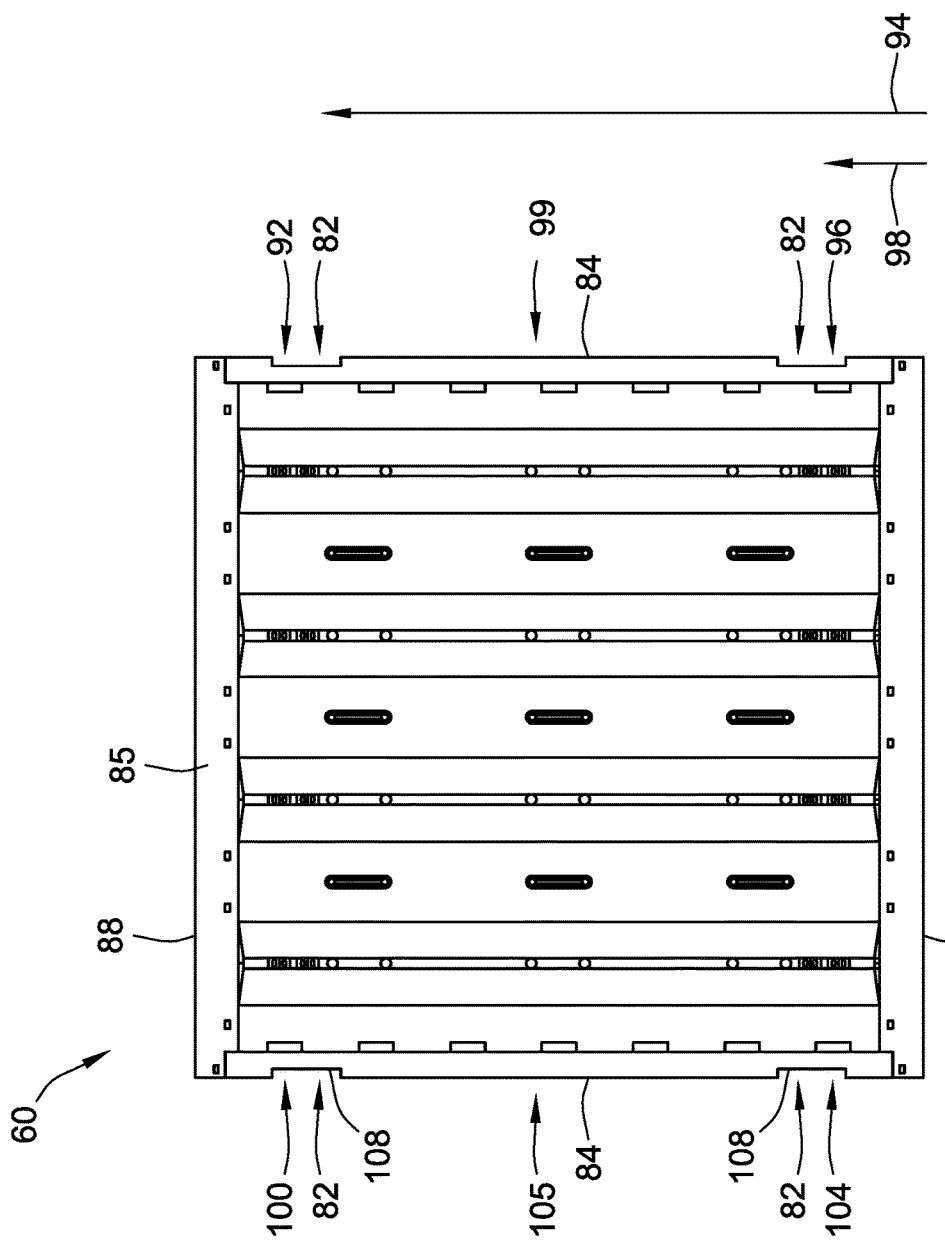
FIG. 3 is a front plan view of a filtration unit having an orientation and clamping system, as described herein.

Referring now to FIG. 3, when filtration unit 60 is oriented in a preferred vertical orientation, mounting frame 85 includes side frame members 84, a bottom frame member 86, and a top frame member 88, which together provide an outward projecting rectangular flange that can serve as a header and interface with the filtration system tube sheet. Mounting frame 85 includes an outer edge 120, and an inner edge 122 facing the central axis of the filtration unit 60. In preferred embodiments, one or more keying notches 82 are provided in one or both side members 84. However, notches 82 may be provided in any one or more of side frame members 84, bottom frame member 86, and/or top frame member 88 of mounting frame 85.

In the exemplary embodiment shown FIG. 3, mounting frame 85 is provided with four notches 82, designated as notches 92, 96, 100, and 104 respectively, positioned on both side frame members 84. Mounting frame 85 may alternately be provided with one, two, three, or five or more notches 82. In another preferred embodiment, one or more notches 82 may be provided on one frame member 84, or on one of top or bottom members 86, 88. In other embodiments, one or more notches 82 may be provided on three or four frame members of mounting frame 85.

Each keying notch 82 of mounting frame 85 may be associated with a defined position which may be measured in reference to a distance, e.g. a height, from a corner or perpendicular face of mounting frame 85 to provide a keying function. As shown in FIG. 3, notch 92 is associated with a height 94 from bottom wall 86, and notch 96 is associated with a height 98 from bottom wall 86. The relative positions of notches 92, 96 thereby define a first key edge 99. Similarly, notch 100 and notch 104 are associated with heights from bottom wall 86, which may be the same as or different from heights 94, 98 respectively. The relative positions of notches 100, 104 thereby define a second key edge 105.

Figure 9:
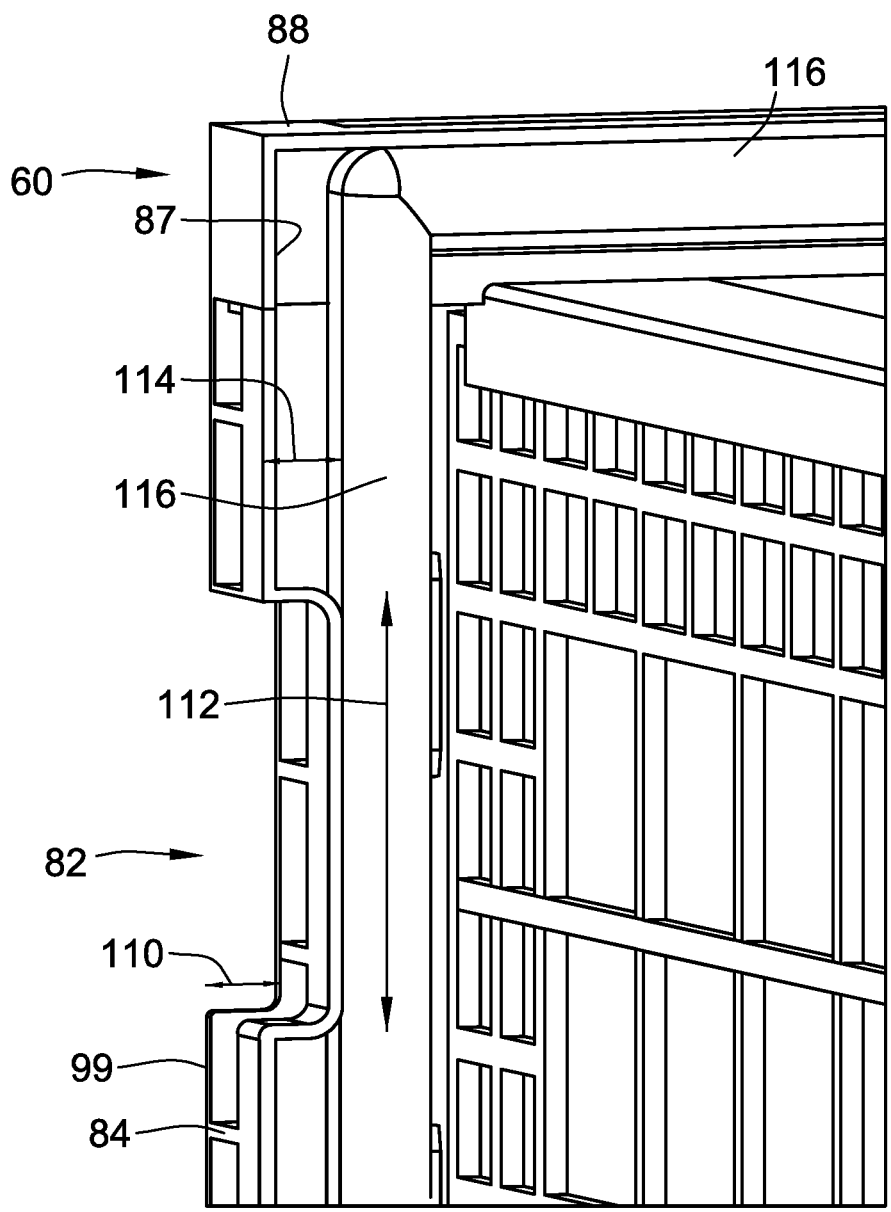
FIG. 9 is an isometric rear detail view of a filtration unit.

Additionally, as best shown in FIG. 9, each notch 82 includes a notch depth 110 and a notch width 112, wherein notch 82 extend entirely through the filter frame 85 in the direction of the central axis of filtration unit 60. Accordingly, each notch 82, for example one or more notches 92, 96, 100, and/or 104 may have similar or different notch depths and/or notch widths. Accordingly, the dimensions of each notch 82 may also be varied to provide one or more unique key edges of filtration unit 60.

In another embodiment, a keying surface is defined by a notch formed in the rectangular filter frame 85 that does not extend entirely through the filter frame 85 in the direction of the central axis of filtration unit 60. The notch may thus define a notch recess height in the direction of the central axis of between ½ and 1 inches, as measured from the back surface 87 of filter frame 85, in addition to a notch depth 110 and a notch width 112. In this embodiment, the end 233 of clamp arm 230 (best shown in FIG. 5) may be at a distance 215 from the centerline of the keying projection that is the same as projection depth 213, such that the clamp arm 230 completely overlaps the clamp shoulder 214 when the clamp 226 is placed in the filter securing position. In other embodiments, ends 233 of clamp arms 230 may extend from the centerline of the keying projection at a distance 215 less than projection depth 213 or a distance 215 greater than projection depth 213.

In a preferred embodiment, each filter type suitable for installation in a corresponding holding frame is associated with at least one unique key edge, such as key edge 99. For example, different grades of filter unit 60 (e.g., type of filter media material, media efficiency, filter area, etc.) may be associated with a unique combination of heights 94, 98, notch depths 110, and/or notch widths 112. In combination with matched clamping systems 200 (described in further detail below), only filtration units compatible with a particular keying face are installable in filter frame 180, thereby preventing installation of incorrect filters that may result in excess transmission of particulates and consequent damage to the gas turbine.

Figure 4:
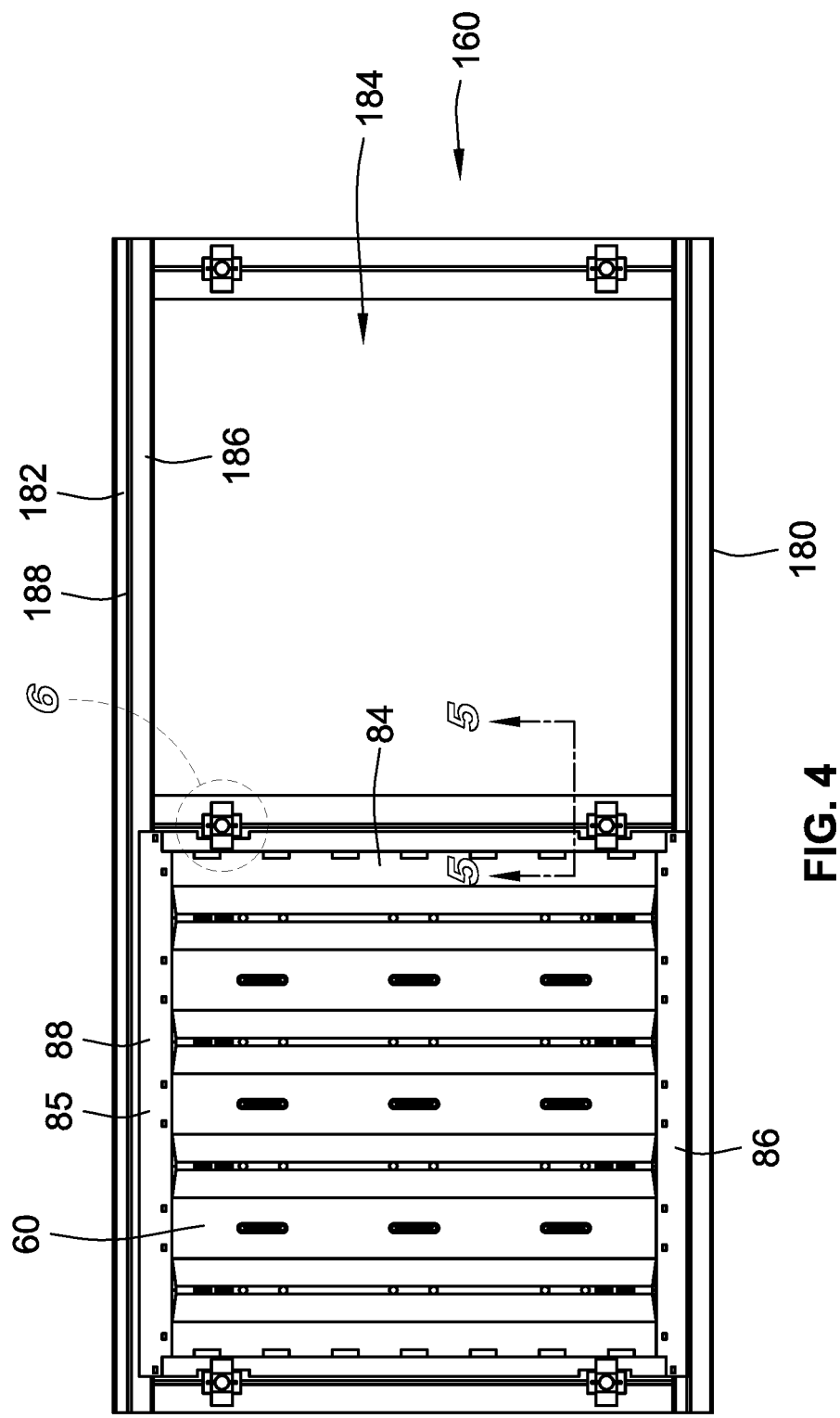
FIG. 4 is a front plan view of a filtration unit and holding frame having an orientation and clamping system, as described herein.

Referring now to FIG. 4, a filtration system 160 is shown. Holding frame 180 is formed from a plurality of holding frame members 182 arranged to form one or more rectangular holding frame apertures 184, collectively that provide a tubesheet. Each holding frame aperture 184 is sized for a corresponding filtration unit 60 to be installed therein. As shown, a filtration unit 60 is installed in one of two holding frame apertures 184. As described above, the filtration units 60 and the holding frame aperture 184 may have a substantially rectangular shape and may be sized according to industry standards.

Figure 5:
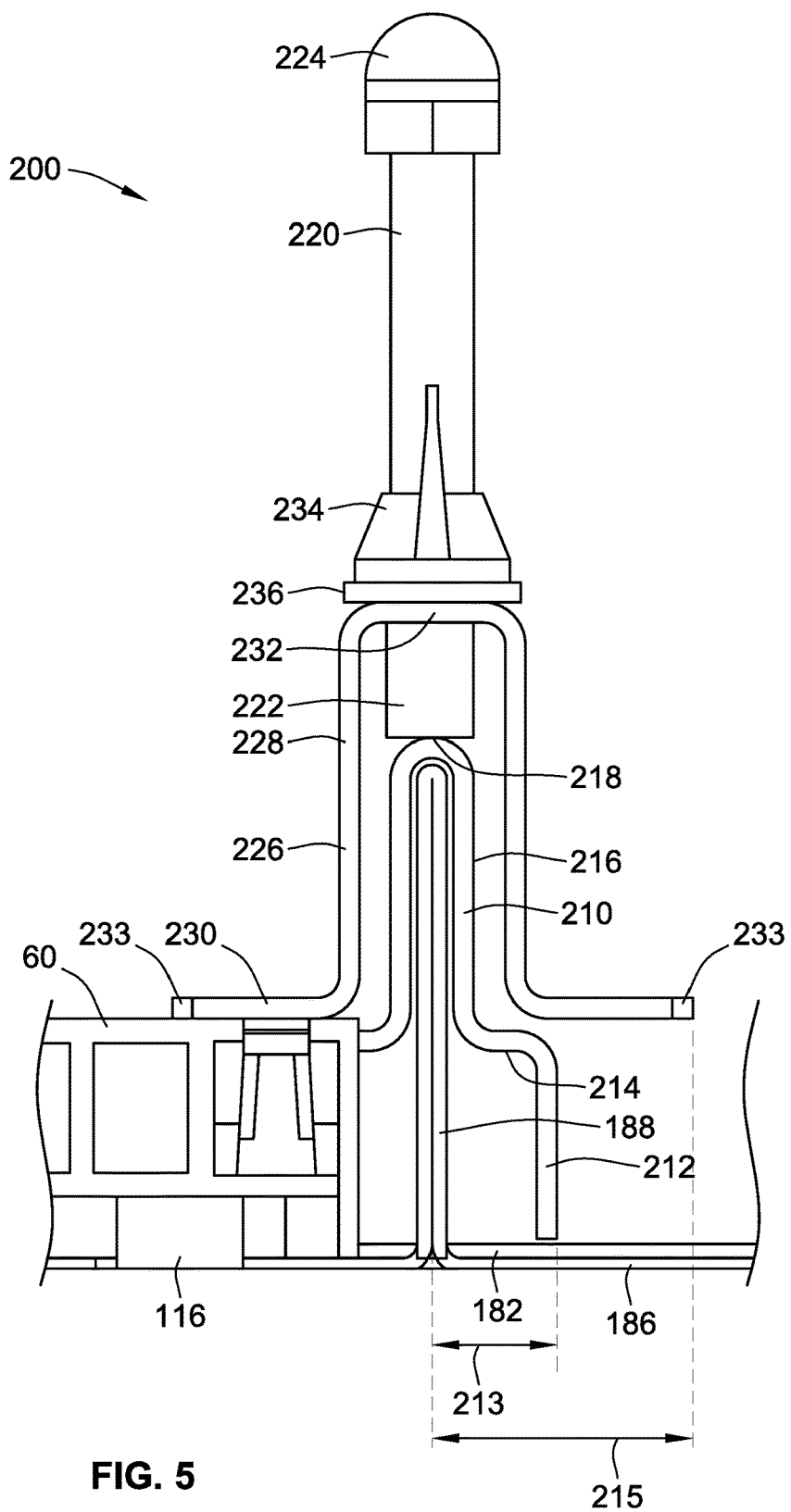
FIG. 5 is a cross-sectional view of a clamping system as described herein.

As shown in FIGS. 4 and 5, holding frame 180 includes a seating surface 186 and an upright wall 188. In some embodiments, upright wall 188 may not be present. In some embodiments, holding frame 180 may be provided as one section of a tube sheet. Seating surface 186 is configured to receive a gasket 116 of a filtration unit 60 and thereby prevent air bypass around filter media 70. Holding frame 180 may include any number of apertures 184 and filtration units 60 to accommodate air flow requirements of a particular air intake system.

Figure 6:
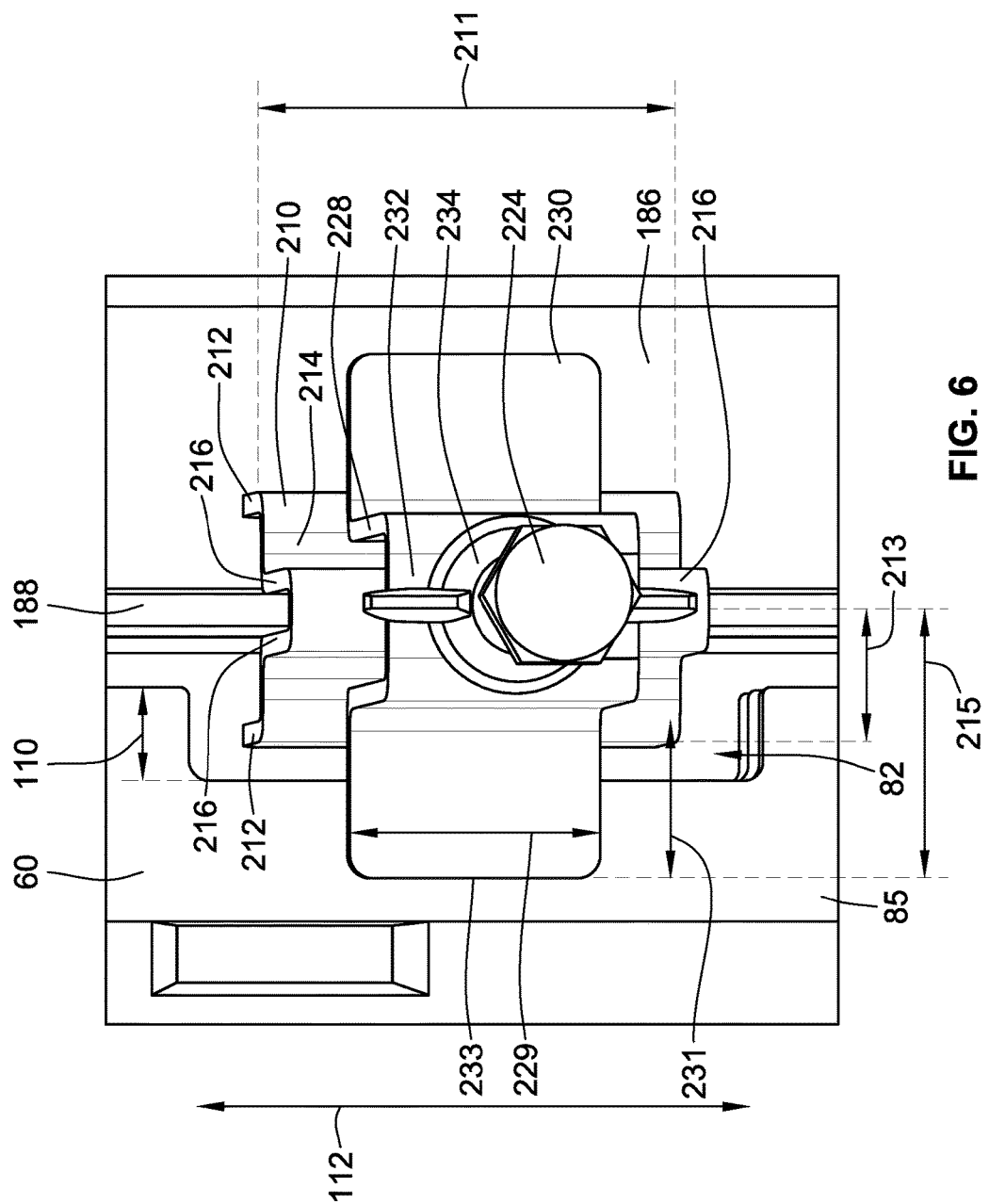
FIG. 6 is a detail perspective view of a clamping system as described herein.

Referring to FIGS. 5 and 6, holding frame 180 includes one or more clamping systems 200. Clamping system 200 is shown securing one filtration unit 60 to holding frame member 182. Each clamping system 200 includes a bracket 210 affixed to upright wall 188 of holding frame members 182. Each bracket 210 includes a keying projection 212, shoulder 214, key projection wall 216, and bracket top 218. Clamp 226 is moveably supported by threaded rod 220. Lower end 222 of threaded rod 220 is coupled to bracket top 218. Threaded rod 220 may optionally include a nut or block 224 at the upper end of threaded rod 220, thereby preventing loss of clamp components during operation of clamping system 200. Alternatively, nut 224 may be removably fixed to threaded rod 220, thereby permitting removal of additional components of clamping system 200 if required.

Clamp 226 includes a clamp body 228, clamp arms 230, and an upper clamp end 232. Clamp body 228 and upper clamp end 232 form an inverted U-shape sized to fit over upright wall 188 and key projection wall 216. Clamp arms 230 define flange facing outward from clamp body 228 at a generally right angle. Together, clamp arms 230, clamp body 228, and clamp end 232 form a hat-shaped cross-section.

Clamp arms 230 engage filter frame 85 of filtration unit 60 when clamp 226 is place in a filter securing orientation. Clamp arms 230 of clamp 226 secure filtration unit 60 against seating face 186 of holding frame members 182, thereby serving as a retainer clip for filtration unit 60. In a typical embodiment, clamp arms 230 engage filter frame 85 at least ½ inch in the direction away from upright wall 188 and parallel to seating surface 186. Downward travel of clamp 226 in the direction of seating surface 186 compresses a gasket 116 against seating face 186 to prevent air bypass. Downward pressure is supplied against clamp 226 by a fastener 234, here shown as wing nut 234 and washer 236.

Keying projection 212 extends inward towards holding frame aperture 184 by a projection depth 213. Shoulder 214 and keying projection 212 may extend further from upright wall 188 than clamp body 228, so that clamp arms 230 partially overlap with clamp shoulders 214. When clamp 226 is placed in the filter retaining position, clamp shoulder 214 thereby limits downward travel of clamp face 230 in the direction of seating surface 186. Accordingly, over-compression of gasket 116 of filtration unit 60 may be prevented without the need for a gasket stop on filtration unit 60. In a preferred embodiment, the gasket is compressed from about 40% to about 60% relative to an uncompressed state when the clamp 226 is rotated from the filter element releasing position to the filter element clamping position. In other embodiments, filter frame 85 may optionally include a gasket stop to prevent compression of gasket 116 by more than a fixed percentage, to prevent overcompression or uneven compression of gasket 116.

Each shoulder 214 of a clamping system 200 defines a projection depth 213, to thereby position key projection 212 at a defined distance from upright wall 188. Projection depth 213 may be varied between individual clamping systems 200 to correspond to a notch depth 110 of a filtration unit 60, thereby providing a unique keying interface to receive a unique keying face 99 of a filtration unit 60. In a typical embodiment, key projection 212 is positioned at least ¼ inch from upright wall 188. In a more preferred embodiment, key projection 212 is positioned between about ½ inch to 1 inch from upright wall 188.

Each key projection 212 further defines a key projection width 211. Key projection width 211 may also be varied between individual clamping systems 200 to correspond to a notch width 112 of a filtration unit 60, thereby providing a unique keying interface to receive a unique keying face 99 of a filtration unit 60.

In other embodiments, key projection width 211 may be constant between clamping systems 200 of holding frame 180. In a typical embodiment, key projection width is between ¼ inch to 4 inches. In a more preferred embodiment, key projection width is between 1 inch to 2 inches.

Clamping systems 200 of filter frame 180 also act as a positioning structure to ensure proper alignment of filter frame 85 and filtration unit 60 within aperture 184. In a preferred embodiment, filtration unit 60 will be centered on aperture 184 with gasket 116 fully seated on seating surface 186 when notches 82 are correctly aligned with corresponding keying projections 212.

Figure 7:
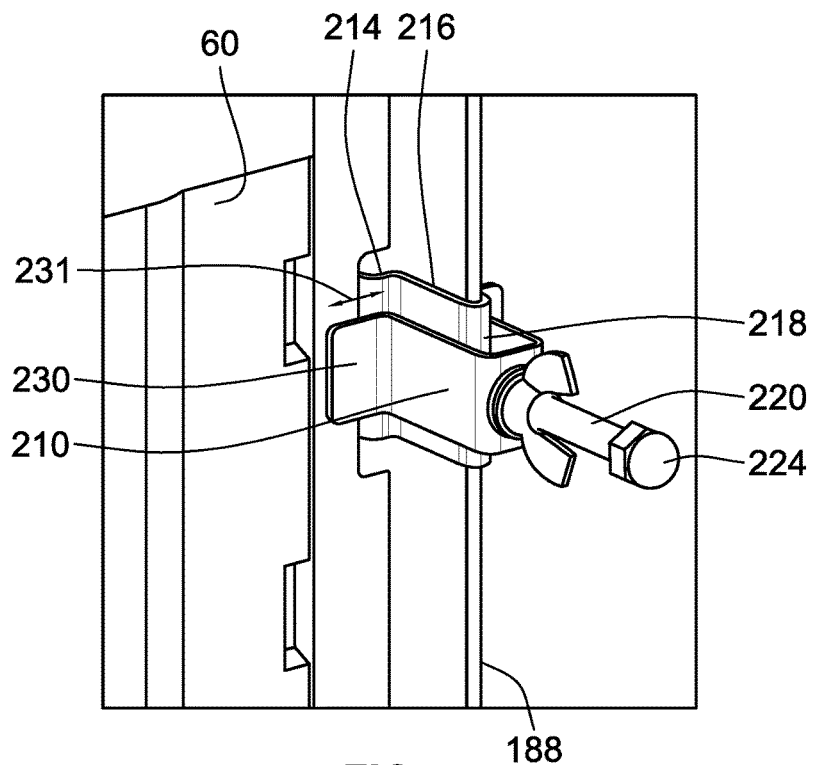
FIG. 7 is an isometric view of a clamping system in a first position.
Figure 8:
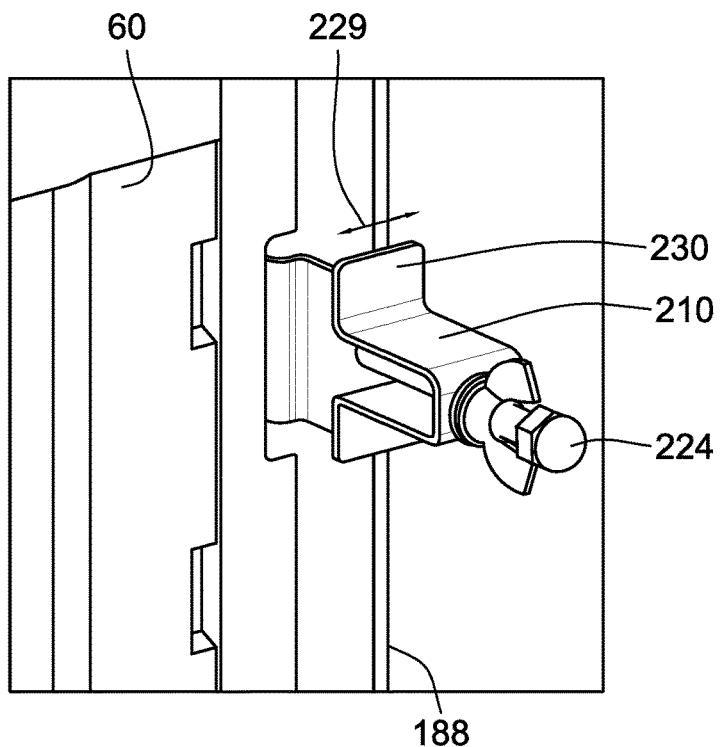
FIG. 8 is an isometric view of a clamping system in a second configuration.

As shown in FIGS. 7 and 8, clamp 226 of clamping system 200 is movable between a securing position (FIG. 7) and a releasing position (FIG. 8). In FIG. 7, clamp 226 is shown securing filtration unit 60 via clamp face 230. As wing nut 234 is moved towards lower end 222 of threaded rod 220, clamp face 230 exerts downward pressure on mounting frame 85. When in the securing position of FIG. 7, the U-shape of clamp body 228 is positioned over upright wall 188, thereby preventing rotation of clamp 226 about threaded rod 220.

In FIG. 8, wingnut 234 is shown loosened upwards, i.e. towards fixed nut 224. Clamp 226 may then be pulled from bracket 210 and rotated about the longitudinal axis of threaded rod 220. The width 229 of clamp face 230 is generally less than the length 231 of clamp face 230, thereby permitting the removal of filtration unit 60 from holding frame 180.

Referring to FIG. 9, a rear detail view of a filtration unit 60 including a notch 82 is shown. Notch 82 includes a notch depth 110 and a notch width 112. In a preferred embodiment, filter frame 85 includes a gasket 116 to be received by seating surface 186 of holding frame 180. As shown, gasket 116 is immediately adjacent to edge of filter frame on non-keyed sides, for example top frame member 88, and inset from a keyed edge 106 of filter frame 85 by depth 114 corresponding to the greatest depth 110 of one or more keying notches 82 on a keyed side, for example key edge 99, such that the notches 82 do not extend within the gasket 116. In other embodiments, gasket 116 may be immediately adjacent to outer edge 120 of filter frame 85 on both keyed and non-keyed sides of filter frame 85, such that the notches 82 extend to within the gasket 116.

To provide for keying, key projection 212 and its key projection width 211 typically correspond to a notch width 112 of the filtration unit 60 or at least a key edge surface of such filtration unit 60, and preferably the key projection matches the notch depth 110, although some clearance is provided in the notches to receive the key projection 212.

Figure 13:
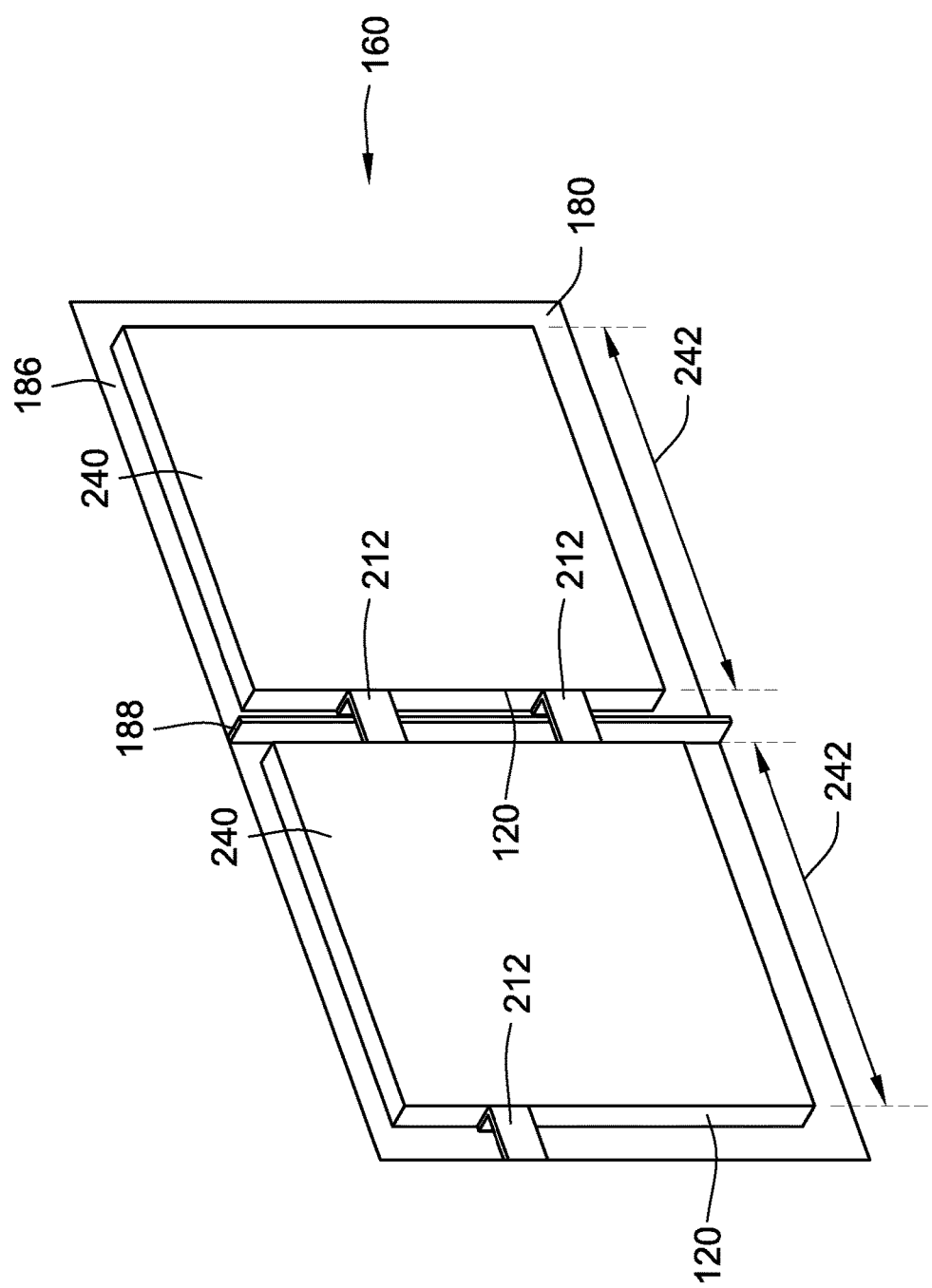
FIG. 13 is a perspective view of a filtration unit, holding frame, and pre-filter as described herein.

Referring also to FIG. 13, in other embodiments the key edge may be also created without a notch by reducing the outside perimeter and outer edge 120 of the rectangular header of such filter unit 240 to be no larger than the span permitted by key projection 212. In such an embodiment, the keying surface is flush and non-discrete from a remainder of the outer edge along a side of the rectangular header frame. For example, when the rectangular header frame is configured for seating against a mounting frame or tube sheet having a rectangular seating surface 186, the key projection 212 extends over the seating surface toward the outer edge 120, such that the remainder of the outer edge 120 (along a side of the rectangular header frame and the keying surface) form a gap with the upright wall of the tubesheet when installed of at least ¼ inch to provide clearance for the key projection 212. However, this may not facilitate unique orientation and may only benefit for the right type or quality of filter (e.g. a filter efficiency or capacity rating). The key projection 212 is such that a conventionally sized filter will not fit (e.g. a standard square 24 inch×24 inch V-Bank Filter, would be slightly too large in width 242 considering the key projection 212 and would not fit. Thus only by modifying the perimeter of filter unit 240 to reduce the width 242 at least slightly to provide an effective key surface is a fit achieved).

Therefore, more preferably, the keying surface edge(s) 99 are defined by positioning notch(es) 82 formed in the rectangular header frame, as shown in FIGS. 3 and 4. This also provides positive feedback to the service technician to see install is correct. Typically and to provide for keying function with these types of filters for gas turbine applications and the type of clamping employed in the filtration system, each notch comprises a notch depth 110 of between 4 mm and 30 mm, and a notch width 112 of between 20 and 600 mm. The depth 110 extends into the outer edge toward the central axis, with the notch width 112 extending perpendicular thereto.

Figure 10:
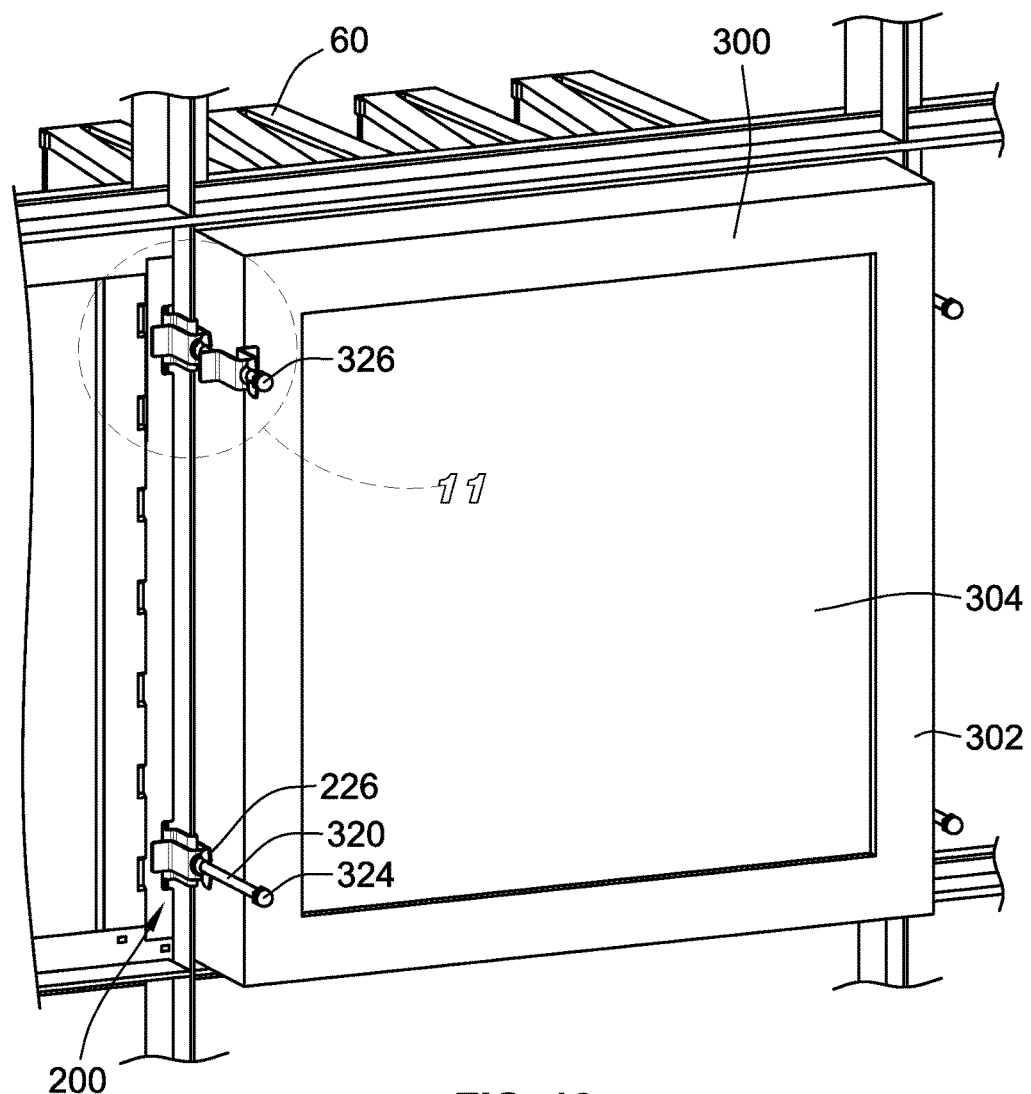
FIG. 10 is a front perspective view of a filtration unit, holding frame, and pre-filter as described herein.
Figure 11:
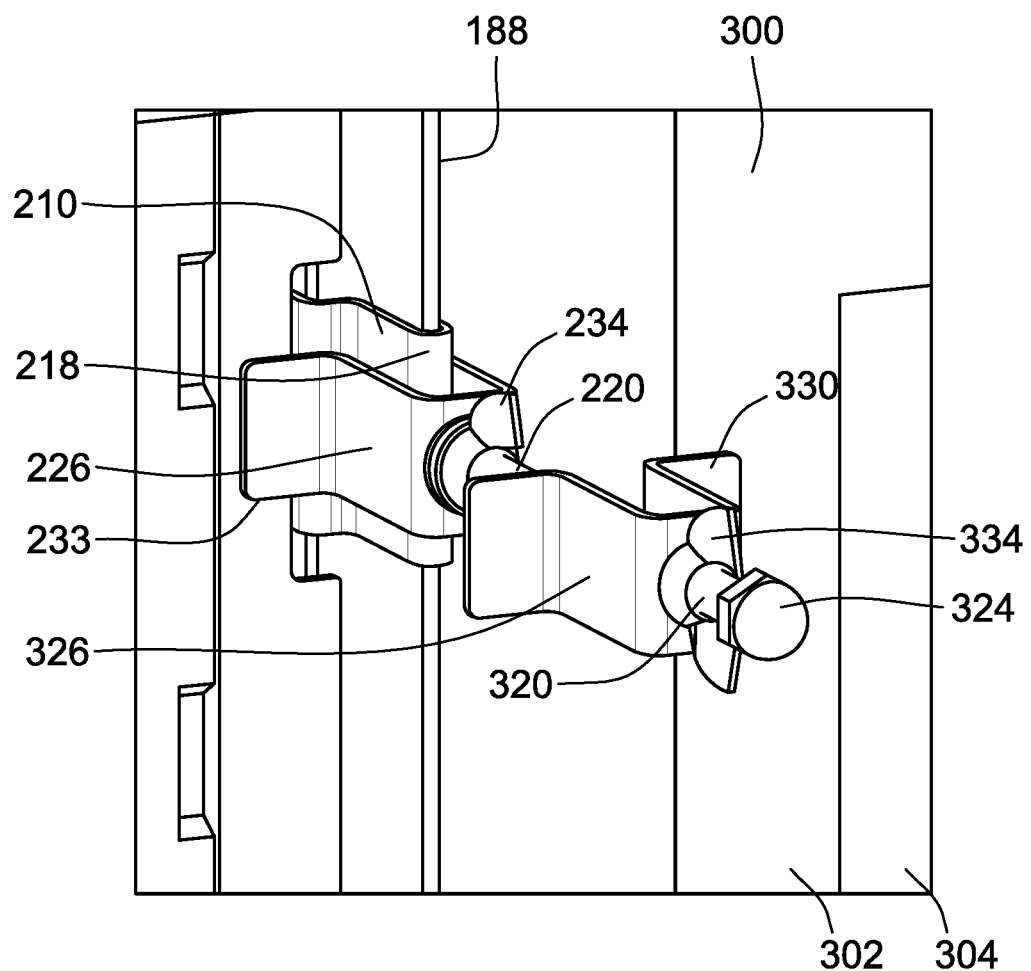
FIG. 11 is a detail view of a filtration unit, holding frame, and pre-filter as described herein.
Figure 12:
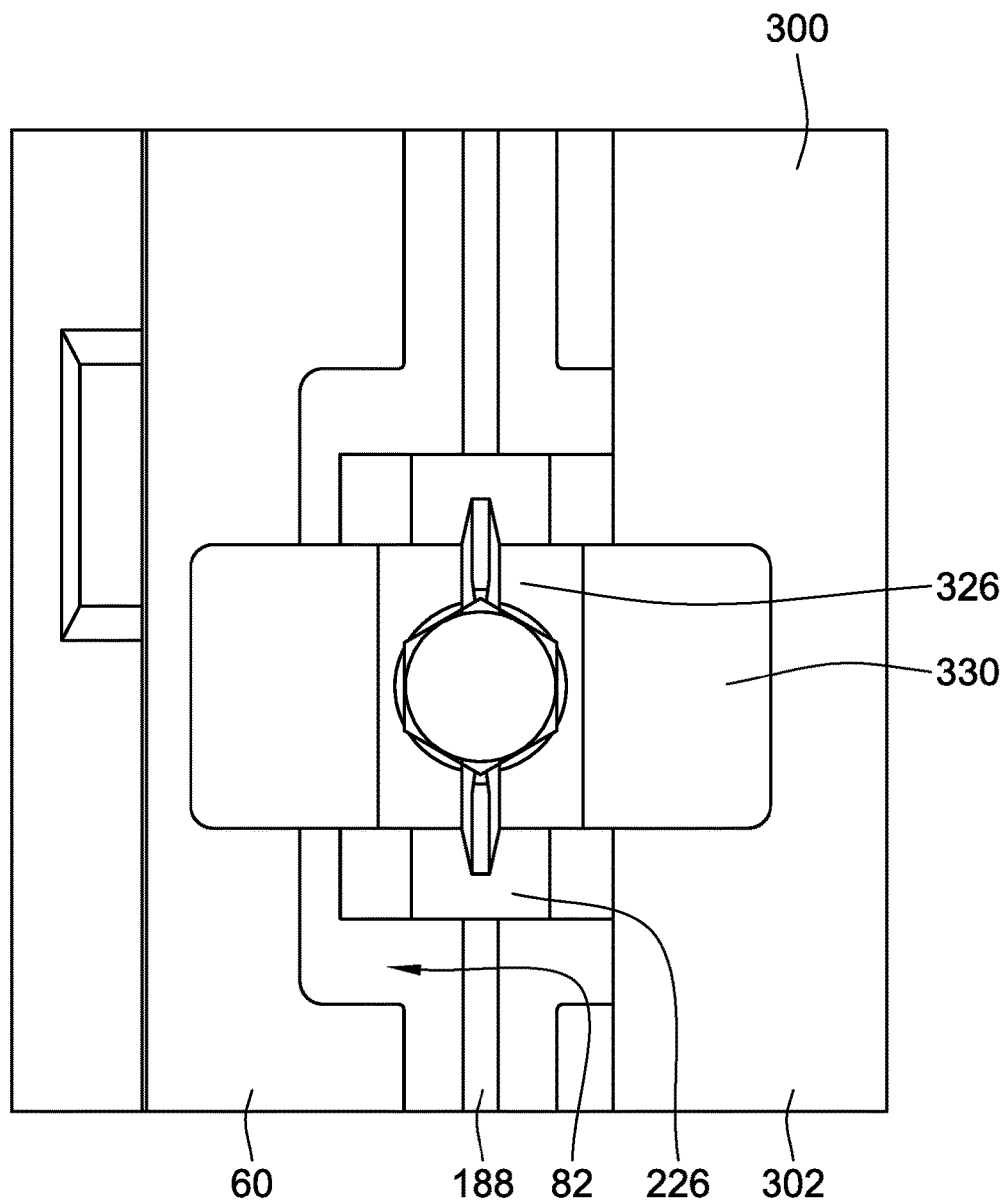
FIG. 12 is a front plan detail view of a filtration unit, holding frame, and pre-filter as described herein.

Referring to FIGS. 10-12, the holding frame and clamping system of the present invention may further be used with a separate prefilter 300 includes a rectangular frame 302 supporting a prefiltration filter media 304. Generally, rectangular frame 302 of prefilter 300 will have the same or similar dimensions to filtration unit 60. As shown, rectangular frame 320 does not include keying notches. Threaded rod 220 is provided with an extended length portion 320. A second clamp 326 may be secured to extended length portion 320 after clamp 226 is positioned to secure filtration unit 60 to holding frame 180.

As best shown in FIG. 11, second clamp 326 may have the same structure and dimensions as clamp 226, including engagement portion 330. In other embodiments, second clamp 326 may be a generally flat bar.

To install the filtration unit 60 and the prefilter 300 on holding frame 180, the filtration unit 60 is first secured via clamp 326 as previously disclosed. Once wing nuts 234 are threaded onto rod 220 and positioned to secured clamps 226, prefilter 300 may be positioned in front of inlet face 62 of filtration unit 60. Second clamps 326 are then positioned on extended length portion 320 and secured with second wing nut 334. In this embodiment, end nut 324 is preferably removable from extended length portion 320 of threaded rod 220 to facility easier manipulation of clamp 226 and wing nut 236. However, in some applications it may be desirable to permanently affix end nut 324 to the extended length portion 320.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter element, compromising:
   an inlet end and an outlet end, the inlet end and the outlet end spaced apart along a central axis at least 3 inches,
   an extension of filter media extending between the inlet end and the outlet end;

a rectangular header frame at one of the inlet and outlet ends, the rectangular header frame defining a perimeter mating interface having a first lateral span of at least 18 inches and a second lateral span perpendicular to the first lateral span of at least 18 inches, the rectangular header frame having an inner edge facing the central axis and an outer edge facing outwardly away from the central axis;

a keying surface provided along the outer edge, the keying surface being at a location between and spaced from corners of the rectangular header frame; and wherein the rectangular header frame is configured for seating against a mounting frame or tube sheet having a rectangular seating surface surrounded by an upright wall with a key projection extending over the seating surface, wherein the remainder of the outer edge along a side of the rectangular header frame and the keying surface are adapted to form a gap with the upright wall when installed of at least ⅛ inch to provide clearance for the key projection.

2. The filter element of claim 1, wherein the keying surface is flush and non-discrete from a remainder of the outer edge along a side of the rectangular header frame.

3. The filter element of claim 1, wherein the filter element is configured as a V-bank filter, comprising:

a pair of end caps extending away from the border frame, the extension of filter media comprising a plurality of filter media sections arranged in a V-Bank configuration, the filter media sections being between the pair of end caps and between the inlet end and the outlet end, the inlet end and the outlet end extending transversely between the end caps, with the at least one cross member extending transversely between end caps at the inlet end or the outlet end, adjacent member sections of the filter media sections converging together at the at least one cross member and diverging away from each other as adjacent member sections extend away from the at least one cross member.

4. The filter element of claim 3, wherein filter media sections are provided by discrete pleated panel filter media packs, the cross members and the border frame sealingly connected to inlet and outlet edges of the filter packs at the inlet and outlet ends, the end caps sealingly connected to side edges of the filter media packs at opposed sides between the inlet end and the outlet end.

5. A filter element, comprising:

an inlet end and an outlet end, the inlet end and the outlet end spaced apart along a central axis at least 3 inches, an extension of filter media extending between the inlet end and the outlet end;

a rectangular header frame at one of the inlet and outlet ends, the rectangular header frame defining a perimeter mating interface having a first lateral span of at least 18 inches and a second lateral span perpendicular to the first lateral span of at least 18 inches, the rectangular header frame having an inner edge facing the central axis and an outer edge facing outwardly away from the central axis;

a keying surface provided along the outer edge, the keying surface being at a location between and spaced from corners of the rectangular header frame; and wherein the keying surface is defined by a notch formed in the rectangular header frame, the notch having a notch recess height in the direction of the central axis of between ½ and 1 inches and a notch width perpendicular thereto of at least ¼ inches, and wherein the notch does not extend completely axially through the rectangular header frame in a direction of the central axis.

6. The filter element of claim 5, wherein the filter element is configured for use with a filtration system including a rectangular holding frame defining a holding frame plane, the holding frame having a clamping assembly comprising a positioning element extending a projection depth in the holding frame plane, the clamping assembly further comprising a clamp member, wherein the keying surface is configured and located to key with the positioning element.

7. The filter element of claim 6, wherein the keying surface comprises first and discrete second key segments that are arranged at different location around the rectangular header frame.

8. The filter element of claim 7, wherein the key segments comprising first and second positioning notches.

9. The filter element of claim 8 wherein the first and second positioning notches are configured with at least one of different dimension relating to at least one of notch height, notch width and notch depth to provide for keying configuration.

10. The filter element of claim 6, wherein the key segments are located at non-symmetrical locations about the rectangular header frame for providing a single unique filter mounting installation for the rectangular holding frame.

11. The filter element of claim 5, wherein the filter element is configured as a V-bank filter, comprising:

a pair of end caps extending away from the border frame, the extension of filter media comprising a plurality of filter media sections arranged in a V-Bank configuration, the filter media sections being between the pair of end caps and between the inlet end and the outlet end, the inlet end and the outlet end extending transversely between the end caps, with the at least one cross member extending transversely between end caps at the inlet end or the outlet end, adjacent member sections of the filter media sections converging together at the at least one cross member and diverging away from each other as adjacent member sections extend away from the at least one cross member.

12. A filter element, comprising:

an inlet end and an outlet end, the inlet end and the outlet end spaced apart along a central axis at least 3 inches, an extension of filter media extending between the inlet end and the outlet end;

a rectangular header frame at one of the inlet and outlet ends, the rectangular header frame defining a perimeter mating interface having a first lateral span of at least 18 inches and a second lateral span perpendicular to the first lateral span of at least 18 inches, the rectangular header frame having an inner edge facing the central axis and an outer edge facing outwardly away from the central axis;

a keying surface provided along the outer edge, the keying surface being at a location between and spaced from corners of the rectangular header frame; and wherein the keying surface is defined by a notch formed in the rectangular header frame, the notch having a notch width of at least ¼ inches, and wherein the notch extends completely axially through the rectangular header frame in a direction of the central axis.

13. The filter element of claim 12, wherein the filter element is configured as a V-bank filter, comprising:

a pair of end caps extending away from the border frame, the extension of filter media comprising a plurality of filter media sections arranged in a V-Bank configuration, the filter media sections being between the pair of end caps and between the inlet end and the outlet end, the inlet end and the outlet end extending transversely between the end caps, with the at least one cross member extending transversely between end caps at the inlet end or the outlet end, adjacent member sections of the filter media sections converging together at the at least one cross member and diverging away from each other as adjacent member sections extend away from the at least one cross member.

14. The filter element of claim 12, wherein the filter element is configured for use with a filtration system including a rectangular holding frame defining a holding frame plane, the holding frame having a clamping assembly comprising a positioning element extending a projection depth in the holding frame plane, the clamping assembly further comprising a clamp member, wherein the keying surface is configured and located to key with the positioning element.

15. A filter element, comprising:
an inlet end and an outlet end, the inlet end and the outlet end spaced apart along a central axis at least 3 inches, an extension of filter media extending between the inlet end and the outlet end;
a rectangular header frame at one of the inlet and outlet ends, the rectangular header frame defining a perimeter mating interface having a first lateral span of at least 18 inches and a second lateral span perpendicular to the first lateral span of at least 18 inches, the rectangular header frame having an inner edge facing the central axis and an outer edge facing outwardly away from the central axis;
a keying surface provided along the outer edge, the keying surface being at a location between and spaced from corners of the rectangular header frame; and
wherein the keying surface is defined at a key location between ½ and 4 inches from a corner of the rectangular header frame, and the keying surface comprises an outer face along the outer edge.

16. The filter element of claim 15, wherein the filter element is configured as a V-bank filter, comprising:
a pair of end caps extending away from the border frame, the extension of filter media comprising a plurality of filter media sections arranged in a V-Bank configuration, the filter media sections being between the pair of end caps and between the inlet end and the outlet end, the inlet end and the outlet end extending transversely between the end caps, with the at least one cross member extending transversely between end caps at the inlet end or the outlet end, adjacent member sections of the filter media sections converging together at the at least one cross member and diverging away from each other as adjacent member sections extend away from the at least one cross member.

17. The filter element of claim 15, wherein the filter element is configured for use with a filtration system including a rectangular holding frame defining a holding frame plane, the holding frame having a clamping assembly comprising a positioning element extending a projection depth in the holding frame plane, the clamping assembly further comprising a clamp member, wherein the keying surface is configured and located to key with the positioning element.

18. A filter element, comprising:
an inlet end and an outlet end, the inlet end and the outlet end spaced apart along a central axis at least 3 inches, an extension of filter media extending between the inlet end and the outlet end;
a rectangular header frame at one of the inlet and outlet ends, the rectangular header frame defining a perimeter mating interface having a first lateral span of at least 18 inches and a second lateral span perpendicular to the first lateral span of at least 18 inches, the rectangular header frame having an inner edge facing the central axis and an outer edge facing outwardly away from the central axis;
a keying surface provided along the outer edge, the keying surface being at a location between and spaced from corners of the rectangular header frame; and
wherein the rectangular header frame comprises an axial thickness of between ½ and 1 inches.

19. A filtration system comprising the filter element of claim 18:
a tube-sheet holding frame, the holding frame comprising:
a plurality of holding frame members arranged in a rectangular configuration to receive a filter element, the holding frame members defining a rectangular seating surface surrounded by upright wall to define rectangular tube sheet openings;
a filter element retainer extending over the seating surface, the retainer having a locking position with a tab over the filter element to secure the filter element to the rectangular surface and an release position clearing the tab from the filter element for facilitating release;
a key projection extending over the seating surface, the keying surface clearing the key projection to allow seating of the filter element along the rectangular seating surface.

20. The filtration system of claim 19, wherein the filter element retainer overlaps the key projection when the filter element retainer is placed in a filter securing position.

21. The filtration system of claim 20, wherein the filter element retainer completely overlaps the key projection when the filter element retainer is placed in a filter securing position.

22. The filtration system of claim 19, wherein the filter element retainer has a hat-shaped profile.

23. A gas turbine comprising the filtration system of claim 19, the filtration system being part of an air intake of the gas turbine.

24. The filter element of claim 18 being for use with a filtration system including a rectangular holding frame having a clamping assembly including a positioning element, wherein the keying surface defines means for keying with the positioning element of the clamping assembly.

25. The filter element of claim 18, wherein the filter element is configured as a V-bank filter, comprising:
a pair of end caps extending away from the border frame, the extension of filter media comprising a plurality of filter media sections arranged in a V-Bank configuration, the filter media sections being between the pair of end caps and between the inlet end and the outlet end, the inlet end and the outlet end extending transversely between the end caps, with the at least one cross member extending transversely between end caps at the inlet end or the outlet end, adjacent member sections of the filter media sections converging together at the at least one cross member and diverging away from each other as adjacent member sections extend away from the at least one cross member.

26. The filter element of claim 18, wherein the filter element is configured for use with a filtration system including a rectangular holding frame defining a holding frame plane, the holding frame having a clamping assembly comprising a positioning element extending a projection depth in the holding frame plane, the clamping assembly further comprising a clamp member, wherein the keying surface is configured and located to key with the positioning element.

27. A filter element, comprising:
an inlet end and an outlet end, the inlet end and the outlet end spaced apart along a central axis at least 3 inches,
an extension of filter media extending between the inlet end and the outlet end;
a rectangular header frame at one of the inlet and outlet ends, the rectangular header frame defining a perimeter mating interface having a first lateral span of at least 18 inches and a second lateral span perpendicular to the first lateral span of at least 18 inches, the rectangular header frame having an inner edge facing the central axis and an outer edge facing outwardly away from the central axis;
a keying surface provided along the outer edge, the keying surface being at a location between and spaced from corners of the rectangular header frame; and
wherein the keying surface is defined by a positioning notch formed in the rectangular header frame, wherein the notch comprises a notch depth of between 4 mm and 30 mm, and a notch width of between 20 and 600 mm, the depth extending into the outer edge toward the central axis, the notch width extending perpendicular thereto.

28. The filter element of claim 27, wherein the rectangular header frame includes a second positioning notch having a second depth of between 4 mm and 30mm and a second width of between 20 and 600 mm, at least one of the second depth and the second width being different than the notch depth and the notch width, respectively, so as to provide a keying configuration.

29. The filter element of claim 27, wherein a total of at least four discrete positioning notches are formed in the rectangular header frame with at least two notches on opposite sides of the rectangular header frame.

30. The filter element of claim 27, wherein the filter element is configured as a V-bank filter, comprising:
a pair of end caps extending away from the border frame, the extension of filter media comprising a plurality of filter media sections arranged in a V-Bank configuration, the filter media sections being between the pair of end caps and between the inlet end and the outlet end, the inlet end and the outlet end extending transversely between the end caps, with the at least one cross member extending transversely between end caps at the inlet end or the outlet end, adjacent member sections of the filter media sections converging together at the at least one cross member and diverging away from each other as adjacent member sections extend away from the at least one cross member.

31. The filter element of claim 27, wherein the filter element is configured for use with a filtration system including a rectangular holding frame defining a holding frame plane, the holding frame having a clamping assembly comprising a positioning element extending a projection depth in the holding frame plane, the clamping assembly further comprising a clamp member, wherein the keying surface is configured and located to key with the positioning element.

32. A filtration system comprising:
a holding frame comprising a first filter aperture and a second filter aperture adjacent to the first filter aperture;
at least one filter clamping system positioned on a first holding frame member of the holding frame and between the first and second filter apertures, wherein the filter clamping system includes a first shoulder bracket extending a first positioning depth from the first holding frame member and a clamp member, wherein the clamp member is rotatable between a filter element clamping position and a filter element releasing position;
first and second filter elements, each filter element comprising:
an inlet end and an outlet end, the inlet end and the outlet end spaced apart along a central axis at least 3 inches,
an extension of filter media extending between the inlet end and the outlet end;
a rectangular header frame at one of the inlet and outlet ends, the rectangular header frame defining a perimeter mating interface having a first lateral span of at least 18 inches and a second lateral span perpendicular to the first lateral span of at least 18 inches, the rectangular header frame having an inner edge facing the central axis and an outer edge facing outwardly away from the central axis;
a keying surface provided along the outer edge, wherein the keying surface is flush and non-discrete from a remainder of the outer edge along a side of the rectangular header frame,
wherein the first and second filter elements are spaced apart by at least the first positioning depth when the first filter element is positioned in the first filter aperture and the second filter element is positioned in the second filter aperture.

33. The filtration system of claim 32, wherein the first and second filter apertures are rectangular.

34. The filtration system of claim 33, wherein the keying surface is provided on the first lateral span, and the first lateral span is greater than the second lateral span.

35. The filtration system of claim 32, wherein the rectangular header frame is configured for seating against a mounting frame or tube sheet having a rectangular seating surface surrounded by upright wall with a key projection extending over the seating surface, wherein the remainder of the outer edge along a side of the rectangular header frame and the keying surface are adapted to form a gap with the upright wall when installed of at least ⅛ inch to provide clearance for the key projection.

36. The filtration system of claim 32, wherein the rectangular header frame comprises an axial thickness of between ½ and 1 inches.

37. The filtration system of claim 32, wherein the first positioning depth is between 4 and 30 mm.

* * * * *